US011160080B2

(12) United States Patent
Webb

(10) Patent No.: US 11,160,080 B2
(45) Date of Patent: *Oct. 26, 2021

(54) COMMUNICATIONS DEVICE, INFRASTRUCTURE EQUIPMENT AND METHODS FOR RECEIVING DOWNLINK CONTROL INFORMATION

(71) Applicant: Sony Corporation, Tokyo (JP)

(72) Inventor: Matthew William Webb, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,538

(22) Filed: Oct. 31, 2019

(65) Prior Publication Data

US 2020/0068551 A1 Feb. 27, 2020

Related U.S. Application Data

(63) Continuation of application No. 16/282,305, filed on Feb. 22, 2019, now Pat. No. 10,506,600, which is a (Continued)

(30) Foreign Application Priority Data

Dec. 2, 2013 (EP) .................................. 13195385

(51) Int. Cl.
*H04W 72/04* (2009.01)
*H04L 1/00* (2006.01)
(Continued)

(52) U.S. Cl.
CPC ......... *H04W 72/046* (2013.01); *H04L 1/0038* (2013.01); *H04L 1/0046* (2013.01);
(Continued)

(58) Field of Classification Search
CPC . H04W 72/0406; H04W 24/10; H04W 48/12; H04L 5/0051; H04L 5/0057
See application file for complete search history.

(56) References Cited

U.S. PATENT DOCUMENTS 8,891,469 B2 * 11/2014 Nishio .................. H04L 5/0023
370/329
9,807,749 B2 * 10/2017 Liang .................. H04W 72/085
(Continued)

FOREIGN PATENT DOCUMENTS

| GB | 2487757 A | 8/2012 |
|---|---|---|
| GB | 2487780 A | 8/2012 |

(Continued)

OTHER PUBLICATIONS

ETSI, "Digital cellular telecommunications system (Phase 2+); Universal Mobile Telecommunications System (UMTS); LTE; Service requirements for Machine-Type Communications (MTG); Stage 1", 3GPP TS 22. 368 version 10.5.0, Release 10, ETSI TS 122 368 V10.5.0, Jul. 2011, pp. 1-17 and Cover Page.

(Continued)

*Primary Examiner* — Romani Ohri
(74) *Attorney, Agent, or Firm* — Xsensus LLP

(57) ABSTRACT

A communications device transmitting/receiving data to/from a mobile communications network includes a transmitter to transmit data to the mobile communications network via a wireless access interface, a receiver to receive data from the mobile communications network via the wireless access interface, and a controller. The wireless access interface includes plural time divided temporal units and in each temporal unit a down-link control channel and a downlink shared channel. The temporal units may be sub-frames of an LTE carrier. The controller can control the receiver to receive downlink control channel information transmitted by the mobile communications network in one (Continued)

or more control channel elements of the downlink control channel, and to receive the downlink control channel information by searching the downlink control channel in a predetermined sub-set of plural possible sets of control channel elements in one or more of the temporal units according to a fixed aggregation level.

20 Claims, 7 Drawing Sheets

Related U.S. Application Data continuation of application No. 15/026,348, filed as application No. PCT/EP2014/071220 on Oct. 3, 2014, now Pat. No. 10,257,834.

(51) Int. Cl.
| | | |
|---|---|---|
| *H04L 5/00* | (2006.01) | |
| *H04L 1/08* | (2006.01) | |
| *H04W 4/70* | (2018.01) | |
| *H04L 1/16* | (2006.01) | |

(52) U.S. Cl.
CPC .......... *H04L 1/0067* (2013.01); *H04L 1/0072* (2013.01); *H04L 1/08* (2013.01); *H04L 5/0053* (2013.01); *H04L 5/0098* (2013.01); *H04W 72/042* (2013.01); *H04L 1/1607* (2013.01); *H04L 5/0094* (2013.01); *H04W 4/70* (2018.02); *H04W 72/0446* (2013.01); *Y02D 30/70* (2020.08)

(56) References Cited

U.S. PATENT DOCUMENTS

| | | | | |
|---|---|---|---|---|
| 2010/0246721 | A1* | 9/2010 | Chen | .................... H04L 5/0053 375/316 |
| 2011/0261768 | A1* | 10/2011 | Luo | ..................... H04L 5/0053 370/329 |
| 2012/0051270 | A1 | 3/2012 | Chen et al. | |
| 2012/0320846 | A1 | 12/2012 | Papasakellariou et al. | |
| 2013/0083753 | A1 | 4/2013 | Lee et al. | |
| 2013/0088973 | A1* | 4/2013 | Yang | ....................... H04L 5/003 370/241 |
| 2013/0183987 | A1* | 7/2013 | Vrzic | .................... H04L 1/0046 455/450 |
| 2014/0161092 | A1* | 6/2014 | Seo | ................... H04W 72/1273 370/329 |
| 2015/0334683 | A1* | 11/2015 | Guo | .................... H04W 72/042 370/329 |
| 2016/0119946 | A1* | 4/2016 | Dai | ....................... H04L 5/0053 370/329 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2493703 A | 2/2013 |
| GB | 2497743 A | 6/2013 |

OTHER PUBLICATIONS

Intel Corporation, "Coverage enhancement of DUUL control channels for low cost MTG", 3GPP TSG-RAN WG1 #75, R1-135105, XP50734807A, Nov. 11-15, 2013, pp. 1-10.

Motorola Mobility, "MTC Coverage improvement for Control Channels", 3GPP TSG RAN WG1 Meeting #75, R1-135674, XP50735329A, Nov. 11-15, 2013, 2 Pages.

"3rd Generation Partnership Project; Technical Specification Group Radio Access Network; Study on provision of low-cost MTC UEs based on L TE; (Release 11)", 3GPP TR 36.888 V02.0, 2012, 15 Pages.

International Search Report dated Jan. 8, 2015 in PCT/EP2014/071220.

\* cited by examiner

Block diagram showing steps in encoding a DCI message into CCEs

COMMUNICATIONS DEVICE, INFRASTRUCTURE EQUIPMENT AND METHODS FOR RECEIVING DOWNLINK CONTROL INFORMATION

CROSS-REFERENCE TO RELATED APPLICATIONS

The present application is a continuation of U.S. application Ser. No. 16/282,305, filed Feb. 22, 2019, which is a continuation of U.S. application Ser. No. 15/026,348, filed Mar. 31, 2016 (now U.S. Pat. No. 10,257,834), which is based on PCT filing PCT/EP2014/071220, filed Oct. 3, 2014, which claims priority to EP 13195385.3, filed in the European Patent Office on Dec. 2, 2013, the entire contents of each are incorporated herein by reference.

BACKGROUND OF THE DISCLOSURE

The present invention relates to communications devices, infrastructure equipment, mobile communications systems and methods for receiving downlink control information at a communications device transmitted from a mobile communications network.

Certain classes of telecommunications device, such as MTC devices (e.g. semi-autonomous or autonomous wireless communication terminals), support "low capability" communication applications that are characterised, for instance, by the transmission of small amounts of data at relatively infrequent intervals. It is preferable that MTC devices are constructed so that individually they represent little burden on telecommunications networks and thus can be deployed in greater numbers than equivalent "full capability" terminals in the same networks.

In many scenarios, it is preferable to provide terminals dedicated to such "low capability" communication applications with a simple receiver unit (or transceiver unit) having capabilities more commensurate with the amount of data likely to be transmitted to (or from) the terminal. This more limited capability contrasts with the capabilities of the conventional mobile telecommunications terminals, such as smartphones, which share access to the same telecommunications networks.

Fourth generation mobile communications systems are being developed in accordance with Long Term Evolution (LTE) standards by the Third Generation Project Partnership (3GPP). In conventional LTE, at least some of the resource elements (REs) comprising a control region are defined by specification to form a number of so-called control channel elements (CCEs) or enhanced control channel elements (ECCEs). A physical downlink control channel (PDCCH), for providing control information to devices, comprises a number of CCEs. An enhanced physical downlink control channel (EPDCCH), for providing control information to devices, comprises a number of ECCEs. The number of CCEs or comprising a particular PDCCH or EPDCCH depends on an aggregation level determined by an eNB of an LTE mobile communications network (see later for discussion of aggregation levels). A UE must search through some number of the (E)CCEs in the control region to determine if there are any that comprise PDCCHs containing control information pertinent to the UE. Some CCEs are searched by all UEs, these CCEs comprising a so-called common search space (CS S), and some (E)CCEs are not searched by all UEs, these (E)CCEs comprising so-called UE-specific search spaces (UESS). A (E)CCE may be part of more than one search space. Typically, (E)PDCCHs comprising (E)CCEs in the common search space contain information relevant to all UEs in a cell and (E)PDCCHs comprising (E)CCEs in a UE-specific search space contain information relevant only to one UE.

As will be appreciated it is desirable for communications devices and particularly but not exclusively reduced capability or MTC type devices to be arranged to consume as little power as possible in order to conserve power and therefore battery life and for the implementation of the device to possible with low complexity so that the modem can have low cost.

SUMMARY OF THE DISCLOSURE

According to embodiments of the present technique a communications device can be to transmit data to or receive data from a mobile communications network. The communications device comprises a transmitter unit adapted to transmit data to the mobile communications network via a wireless access interface provided by the mobile communications network and a receiver unit adapted to receive data from the mobile communications network via the wireless access interface and a controller. The wireless access interface includes a plurality of time divided temporal units and in each temporal unit a down-link control channel and a down-link shared channel. The temporal units may for example be sub-frames of an LTE carrier. The controller is configured to control the receiver unit to receive downlink control channel information transmitted by the mobile communications network in one or more control channel elements of the downlink control channel in one of the temporal units of the wireless access interface. The one or more control channel elements in which the downlink control channel information is transmitted is one of a plurality of sets of possible control channel elements in which the mobile communications network can transmit the downlink control information in one of the temporal units of the wireless access interface for communications devices to search for the downlink control information in each of the plurality of possible sets of control channel elements. The controller is configured for the communications device to control the receiver unit to receive the downlink control channel information by searching the downlink control channel in a predetermined sub-set of the plurality of possible sets of control channel elements in one or more of the temporal units of the wireless access interface according to a fixed aggregation level.

It is known in some communications systems such as LTE communications systems to provide an arrangement in which downlink control information (DCI) is transmitted in one of a plurality of possible sets of control channel elements (CCEs). The plurality of possible sets of CCEs can be considered as being divided into sub-sets, each of the sub-sets providing sets of CCE which are determined in accordance with a certain aggregation level (AL), which defines a number of repetitions of the DCI information in the downlink control channel. The ALs are set in accordance with an estimated coverage, because the CCEs are aggregated so that the number of CCEs in an AL is proportional to the ability of a receiver to detect the DCI message. However a communications device must be configured to search all possible combinations of CCEs for each possible ALs. The greater the search space which the communications device must perform, the greater the power consumed.

Embodiments of the present technique can therefore provide an arrangement in which a predetermined sub-set of the possible sets of CCEs is selected for a particular aggregation level to communicate the DCI for communications devices which are configured in accordance with the present technique. A communications device configured in accordance with the present technique may be one of a class of communications devices, which may for example be reduced capability devices. Therefore by setting a predetermined sub-set of the possible sets of CCEs in which to transmit the DCI message, the communications device need only search this predetermined sub-set of the possible sets of CCEs. As a result there is a proportional reduction in the amount of power consumed by the receiver unit, thereby increasing battery life for the device. The predetermined set of CCEs may be defined in accordance with a specification for a communications system or may be configured by the mobile communications network. In some example the mobile communications network first identifies that the communications device is one which is configured to operate with a reduced search space and then to transmit the DCI using only a set from the predetermined sub-set of the possible sets of CCEs providing one or more CCEs according to a fixed aggregation level. In another example the communications device is configured to receive the downlink control channel information by searching for the downlink control channel information in either the predetermined sub-set of the plurality of possible sets of control channel elements in one of more of the temporal units according to the fixed aggregation level or a second sub-set of possible sets of the control channel elements which is selected from the plurality of sets of the possible control channel elements in one or more temporal units according to a configurable aggregation level. According to these embodiments the mobile communications network may provide an indication to the communications device of one or both of the predetermined sub-set of possible CCEs or the second configurable sub-set of possible CCEs, whereby the DCI is transmitted in either a set of CCEs from either the predetermined sub-set of the sets of CCEs or the second sub-set of possible CCEs.

Various further aspects and embodiments of the invention are defined in the appended claims, including but not limited to, a mobile communications system, an infrastructure equipment or network element for communicating data to and/or from communications devices and a method of communicating data to and/or from mobile communications devices in a mobile communications system.

BRIEF DESCRIPTION OF DRAWINGS

Embodiments of the present invention will now be described by way of example only with reference to the accompanying drawings wherein like parts are provided with corresponding reference numerals and in which.

DESCRIPTION OF EXAMPLE EMBODIMENTS

Figure 1:
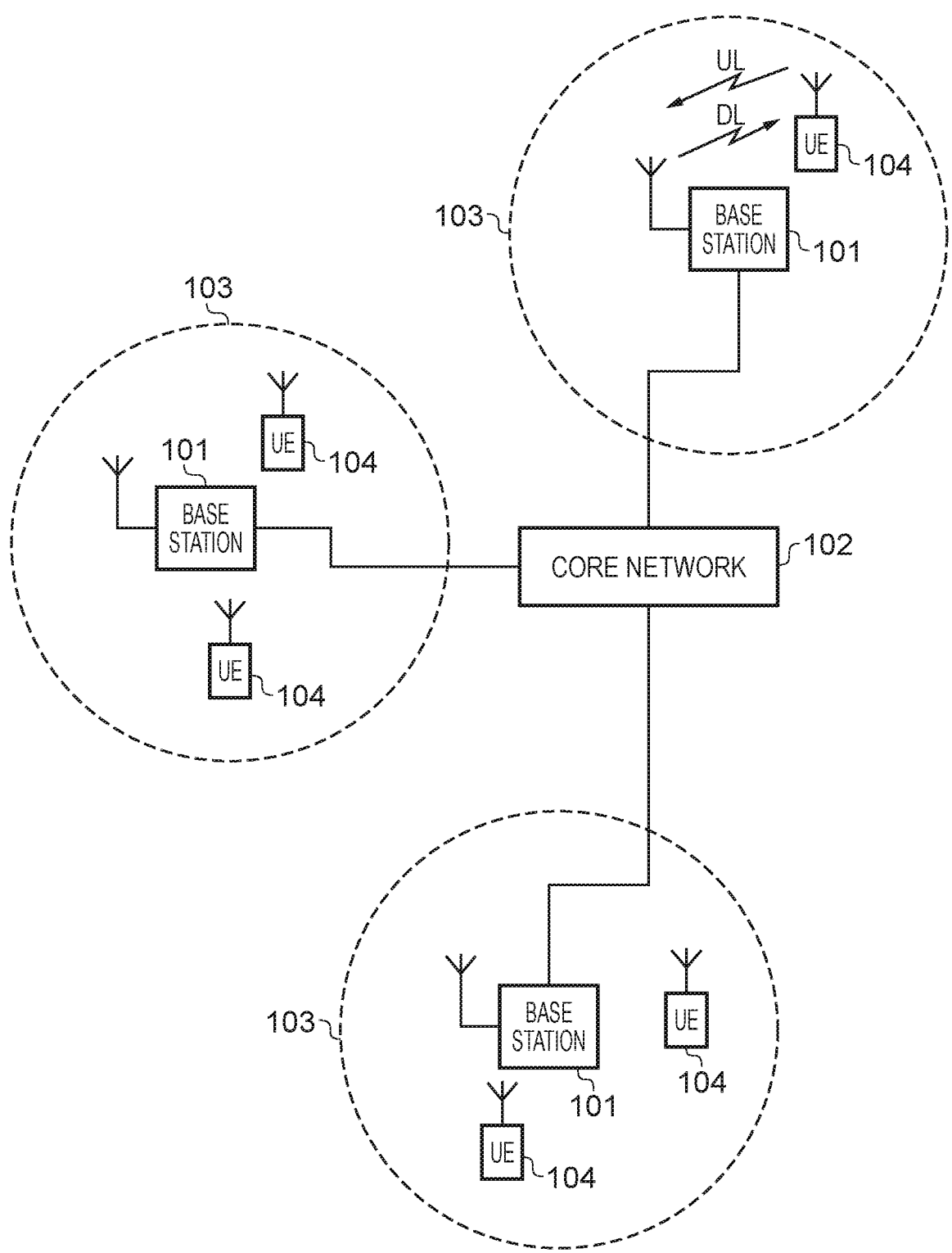
FIG. 1 provides a schematic diagram illustrating an example of a conventional mobile communication network.

The control region defined in current releases of LTE includes the PCFICH, PHICH, PDCCHs and reference signals (RS). A subframe may also contain EPDCCHs. Of interest here is the physical downlink control channel (PDCCH) and the enhanced physical downlink control channel (EPDCCH). A UE must search through the control region and/or the region of the subframe containing EPDCCH to find, in Release 11 LTE specifications, up to two sets of information carried on (E)PDCCHs: a first set that is broadcast to all UEs, and a second set that is intended for the UE alone. This searching is done by "blindly decoding" all possible locations and combinations of resource elements (REs) that could form the UE's (E)PDCCH, and the channel specifications define how the REs should be combined into (E)PDCCH candidates.

The procedure for searching all possible (E)PDCCH candidates is termed "blind decoding" as no information beyond what is provided in specifications is provided in advance by the network that would allow a more targeted search. This means that all UEs scheduled in one subframe must have their respective control information embedded in the control region. With a large number of UEs, such as may arise in MTC scenarios, there could be the possibility of insufficient resource available to assign each scheduled UE a (E)PDCCH in the control region of one subframe.

In LTE, the identifier used to direct data to any given UE is known as a Radio Network Temporary Identifier. Depending upon the context within a communication session, the RNTI may take one of a number of forms. Thus data that is UE specific uses either a C-RNTI (cell RNTI) or a temporary C-RNTI; data intended for broadcast of system information uses a SI-RNTI (system information RNTI); paging signals use a P-RNTI (paging RNTI); messages concerning the random access procedure (RA procedure) use RA-RNTI (random access RNTI), etc. The C-RNTI thus uniquely identifies a UE in a cell. RNTIs are assigned from a range of 16-bit values, and specifications restrict which RNTIs may be taken from which ranges within the total possible range.

A UE determines whether a particular (E)PDCCH is intended for itself by attempting to decode each possible set of REs that could be a PDCCH, according to the specifications and the eNB configuration. In LTE, each RRC-connected UE is assigned a 16-bit C-RNTI, which allows a maximum of about 65000 users to be RRC connected. The assigned C-RNTI (or other UE ID) is used to uniquely address control information to specific UEs in the cell. To reduce signalling overhead, the UE ID will not be sent explicitly. Instead, part of the (E)PDCCH data intended for the UE is scrambled (masked) with a mask uniquely associated with the UE ID by the eNB (or other network access entity). In a particular example, the CRC bits (cyclic redundancy checking bits—primarily used in error correction procedures) are scrambled using the C-RNTI.

PDCCH data scrambled with the UE's own C-RNTI may only be de-scrambled with that same C-RNTI. Thus, in the example, each UE descrambles the received CRC bits with its own mask before doing a CRC check.

C-RNTIs are assigned to UEs by the network during the random access (RA) procedure. A similar process is conducted to locate any broadcast information, which has CRC scrambled by a common RNTI known to all UEs in the cell, such as the P-RNTI or the SI-RNTI.

In the absence of a separate UE identifier, 2G and 3G technologies seek to identify UEs by reference to the International Mobile Subscriber Identity (IMSI)—strictly, the IMSI is a subscriber identifier often associated with subscriber identification module cards ("SIMs"). The IMSI is still a feature of LTE technologies and, where a single SIM is present in each UE, the IMSI may be used as a further identifier of the UE within the cell.

Control information is packaged for transmission over the (E)PDCCH in standardised Downlink Control Information (DCI) messages. These DCI messages take different formats depending upon their purpose. DCI formats include: uplink grant signals; downlink shared channel resource allocation signals; Transmit Power Control (TPC) commands, which adapt the transmit power of the UE to save power; and MIMO precoding information. A more detailed discussion of 3GPP standard DCI formats may be found in 3GPP TS 36.212 (Section 5.3.3.1), which is incorporated herein by reference.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from communications devices (also referred to as mobile terminals, MT or User equipment, UE) 104. Data is transmitted from base stations 101 to UEs 104 within their respective coverage areas 103 via a radio downlink. Data is transmitted from UEs 104 to the base stations 101 via a radio uplink. The core network 102 routes data to and from the UEs 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
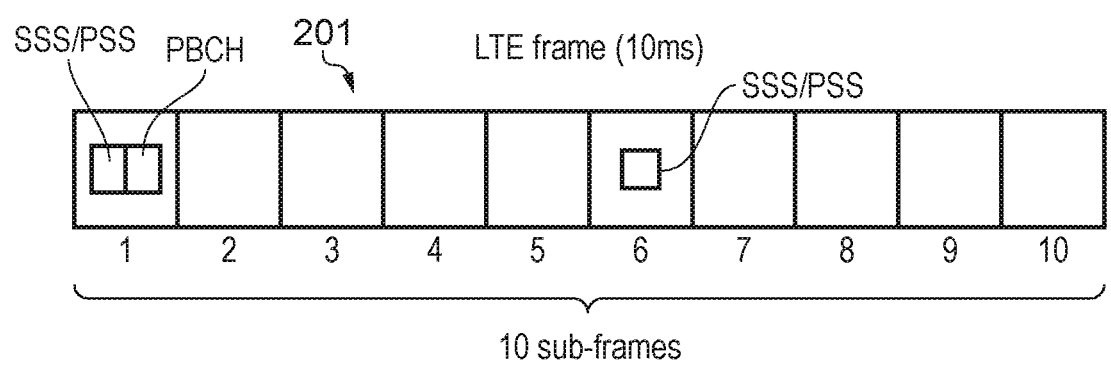
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
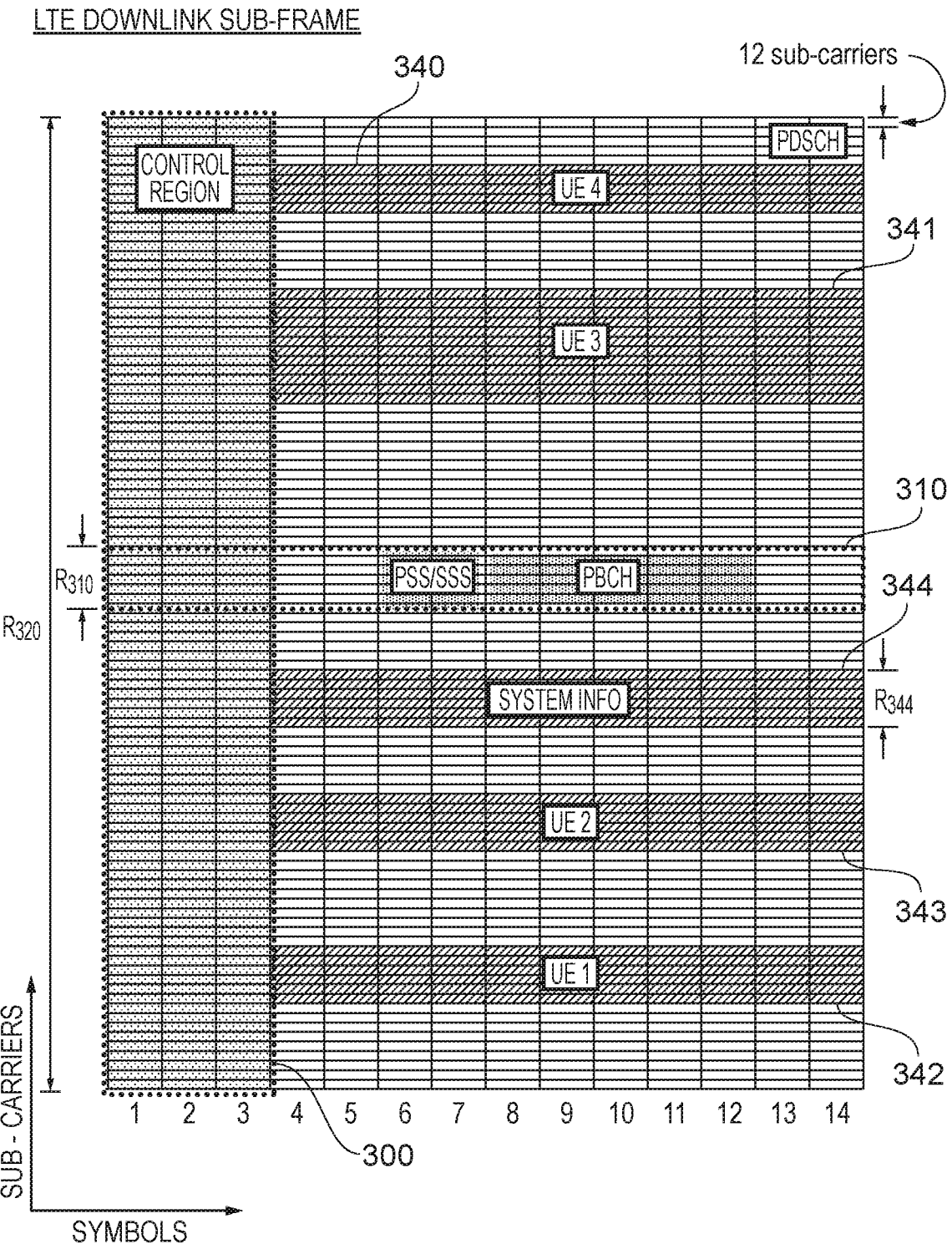
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are each transmitted over a respective 1/14 ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "resource block" comprising twelve sub-carriers transmitted over one slot (0.5 sub-frame). Each individual box in the sub-frame grid in FIG. 3 corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for system bandwidths of 3 MHz or greater and where n can vary between two and four symbols for system bandwidths of 1.4 MHz. For example, with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

Data indicating which sub-carriers on which symbols of the sub-frame have been allocated to specific LTE terminals is contained on PDCCH. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH, when transmitted, contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE UE to achieve frame synchronisation and determine the cell identity of the enhanced Node B (eNB) transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network.

Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

Reduced Capability/MTC Type Devices

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc; medical alert and diagnosis, etc. Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation UE such as a smartphone, an MTC-type terminal is preferably relatively simple and inexpensive: in addition MTC-devices are often deployed in situations that do not afford easy access for direct maintenance or replacement. Therefore reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16 QAM or 64 QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, or simplified receive processing requirements, there is a desire to optimise the use of the available bandwidth in a telecommunications system supporting such devices.

In many scenarios, providing low capability terminals such as those with a conventional high-performance LTE receiver unit capable of receiving and processing (control) data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit, which is more proportionate with the amount of data likely to be transmitted to the terminal. Furthermore it is desirable that such MTC type devices are arranged to have as lower power consumption as possible and therefore have an extended battery life, so that such devices can operate for a long time before they need to be re-charged.

As disclosed in our co-pending patent applications it has been proposed to provide a "virtual carrier", which is tailored to low capability terminals such as MTC devices within the transmission resources of a conventional OFDM type downlink carrier (i.e. a "host or system carrier"). Unlike data transmitted on a conventional OFDM type downlink carrier, data transmitted on the virtual carrier can be received and decoded without needing to process the full bandwidth of the downlink host OFDM carrier, for at least some part of a sub-frame. Accordingly, data transmitted on the virtual carrier can be received and decoded using a reduced complexity receiver unit.

Figure 4:
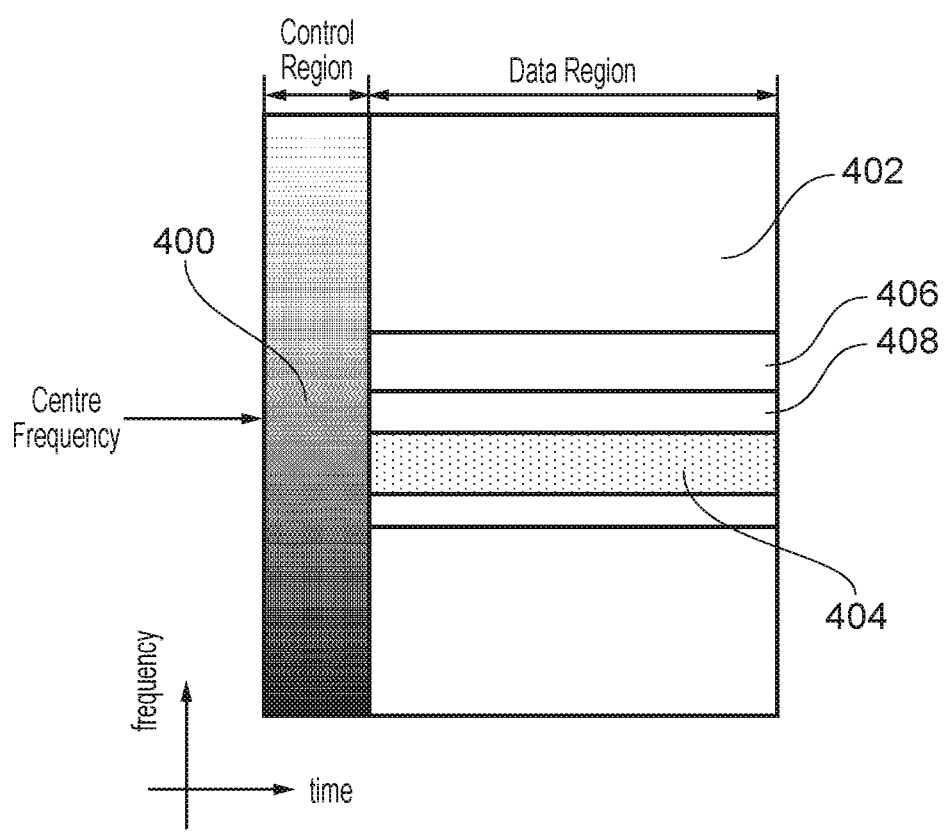
FIG. 4 provides a schematic diagram illustrating an example of a LTE downlink radio sub-frame in which a narrow band virtual carrier has been inserted at the centre frequency of the host carrier, the virtual carrier region abuts the wideband PDCCH control region of the host carrier—making a characteristic "T-shape"

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. FIG. 4 schematically represents an arbitrary downlink subframe according to the established LTE standards as discussed above into which an instance of a virtual carrier 406 has been introduced. The subframe is in essence a simplified version of what is represented in FIG. 3. Thus, the subframe comprises a control region 400 supporting the PCFICH, PHICH and PDCCH channels as discussed above and a PDSCH region 402 for communicating higher-layer data (for example user-plane data and non-physical layer control-plane signalling) to respective UEs, as well as system information, again as discussed above. For the sake of giving a concrete example, the frequency bandwidth (BW) of the carrier with which the subframe is associated is taken to be 20 MHz. Also schematically shown in FIG. 4 by black shading is an example PDSCH downlink allocation 404. In accordance with the defined standards, and as discussed above, individual UEs derive their specific downlink allocations 404 for a subframe from PDCCH transmitted in the control region 400 of the subframe.

The pre-established restricted frequency band used to communicate, e.g. on PDSCH in LTE, from a base station to a UE, is thus narrower than the overall system frequency band (carrier bandwidth) used for communicating physical-layer control information, e.g. on PDCCH in LTE. As a result, base stations may be configured to allocate downlink resources for the UE on PDSCH only within the restricted frequency band. As explained in above with reference to FIG. 3 and in contrast to FIG. 4, in a conventional downlink LTE sub-frame information regarding which symbols contain data relevant to which terminals is transmitted on the PDCCH during the first symbol or symbols of the sub-frame. However as shown in FIG. 4, there is also shown an Enhanced PDCCH (EPDCCH) 408, which is narrow in band width, but wide in time and may occupy in time the sub-frame after the PDCCH. Therefore communications devices may be arranged to acquire DCI information from CCEs transmitted within the EPDCCH.

Transmitting DCI

There are four families of DCI message, grouped into 'formats'. Which DCI message format is encoded on an (E)PDCCH depends on whether the information is to control UL or DL transmissions and which UL or DL Transmission Mode the UE is configured with. The process of encoding a DCI message into a PDCCH is illustrated in FIG. 5.

Figure 5:
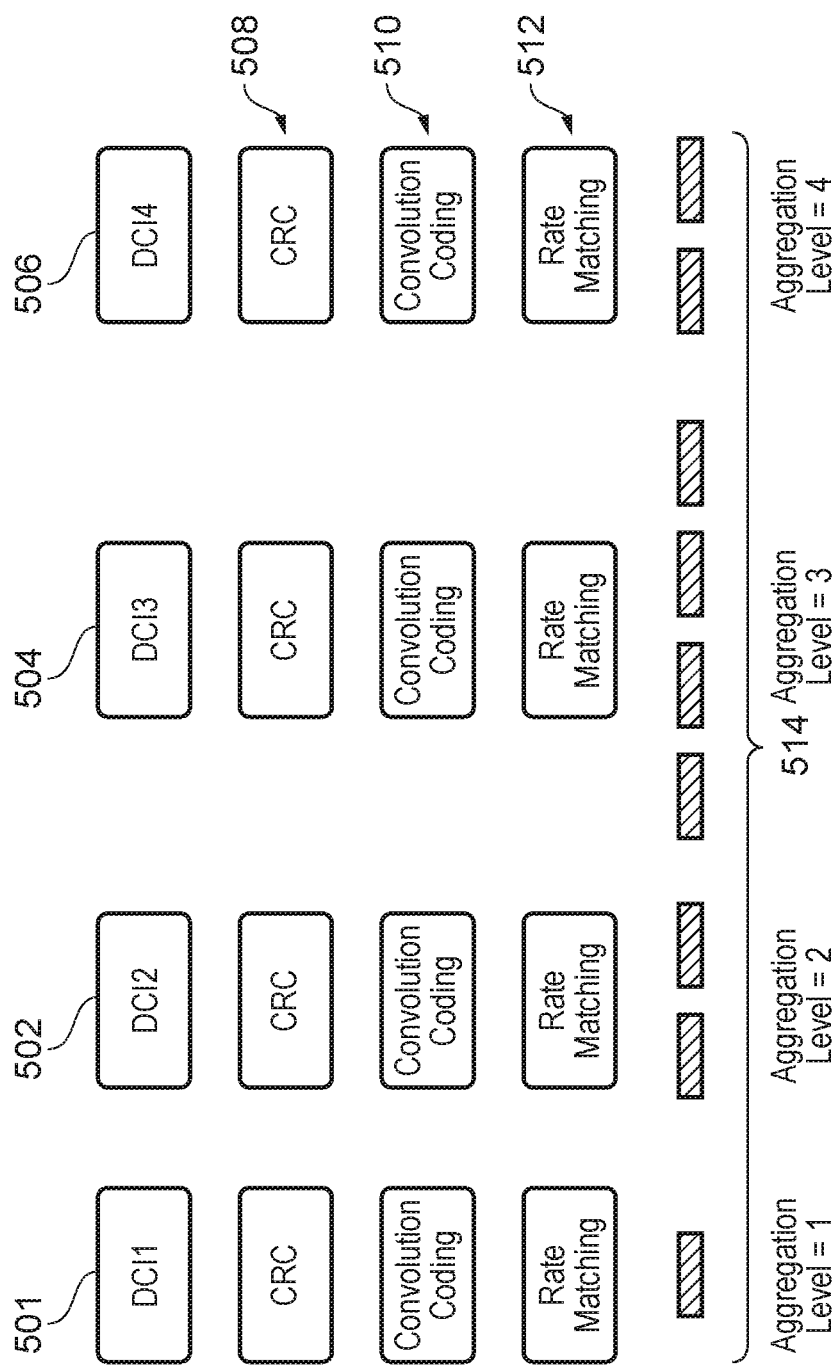
FIG. 5 provides a schematic diagram illustrating a transmission of downlink control channel (DCI) messages according to different configurations for mapping the DCI message onto different combinations of CCEs according to different aggregation levels.

As shown in FIG. 5, each of the boxes 501, 502, 504, 506 represents a different encoding of one DCI, which is encoded into a control channel element (CCE) or enhanced control channel element (ECCE), and a (E)CCE is mapped onto the resource elements (REs) 514 of the physical resource grid according to specification rules. The control channel REs are grouped into (enhanced) resource element groups, (E)REGs. A REG consists of 4 consecutive REs which do not contain reference symbols. An EREG consists of 8 or 9 REs which are not in general consecutive and may include REs containing reference symbols. A CCE is mapped to a set of 9 REGs which are distributed in time and frequency. An ECCE is mapped to four or eight EREGs which are distributed in time and frequency. As shown in FIG. 5, the content of each of the example DCI messages 501, 502, 504, 506 are encoded with a cyclic redundancy check (CRC) 508, convolutionally encoded 510 and rate matched to match the amount of information to the (E)CCEs on which the DCI 501, 502, 504, 506 is to be transmitted. An (E)CCE is thereby mapped according to specification rules to a number of (E)REGs and thereby to a number of REs which are interleaved in time and frequency Also shown in FIG. 5 is a representation of different aggregation levels 514 which can be used to transmit a DCI within a different number of CCEs in the PDCCH of each sub-frame. Depending on an amount of power the eNB wishes to allocate to the (E)PDCCH for a particular message, the eNB can transmit the DCI at different 'aggregation levels' (ALs), amounting to sending more than one (E)CCE 514 containing the DCI message. On PDCCH, ALs of 1, 2, 4, or 8 CCEs are supported. On EPDCCH, ALs of 1, 2, 4, 8, 16, or 32 ECCEs are supported. For example, a UE in a deep coverage situation where radio pathloss is high might be sent a (E)PDCCH with a high AL. In the example of FIG. 5, 'DCI1' has been sent at AL1, 'DCI2' at AL2, 'DCI3' at AL4 and 'DCI4' at AL2.

As explained above and illustrated in FIG. 5, the cyclic redundancy check (CRC) 508 is attached to the DCI, and to allow the UEs to distinguish (E)PDCCHs which they should or should not decode, the CRC is scrambled by a radio network temporary identifier (RNTI) which takes different specified values according to the purpose of the DCI message.

Searching Possible CCEs

As will be understood from the above explanation, an enhanced physical downlink control channel (E)(PDCCH) comprises a number of (E)CCEs. The number of (E)CCEs comprising a particular (E)PDCCH depends on the aggregation level (AL) determined by the eNB. A UE must search through some number of the (E)CCEs in a subframe to determine if there are any that comprise (E)PDCCHs containing control information pertinent to the UE.

Some (E)CCEs are searched (monitored) by all UEs in the cell, these (E)CCEs comprising one or more common search spaces (CSS). The CCEs in and the order in which the CCEs of the CSSs within each subframe are searched by UEs remains static and is given by the specification.

Some (E)CCEs are not searched by all UEs, these (E)CCEs comprising a plurality of UE-specific search spaces (UESS). The (E)CCEs of the UESS for a given UE within each subframe is dependent upon the relevant RNTI for that UE and the subframe number: the CCEs with which any one UE begins searching a UESS will also change between subframes within a radio frame.

A (E)CCE may be part of more than one search space. Typically, (E)PDCCHs comprising (E)CCEs in a common search space contain information relevant to all UEs in a cell and (E)PDCCHs comprising (E)CCEs in a UE-specific search space contain information relevant only to one UE.

A typical blind decoding process will make around ten attempts to decode common search space PDCCHs. The number of attempts may be restricted as the CSS is limited to only certain DCI formats (i.e. 0, 1A, 3, 3A—see 3GPP TS 36.212)—which carry data relevant to all UEs in the cell. Furthermore the size of the CSS is restricted to a predefined number of control channel elements (2 aggregations of 8-CCEs or 4 aggregations of 4-CCEs).

By contrast, many more blind decoding attempts (~30) are typically required to decode UE-specific search space (UESS) successfully: more possibilities are available to the eNB in terms of the level of aggregation applied to UESS (see the discussion of aggregation levels below) and in terms of DCI formats for data directed to specific UEs.

The AL of which a (E)PDCCH consists is determined by the eNB and is not signalled to the UE. The UE is required to search blindly for (E)PDCCHs addressed to RNTIs it is configured to receive. The specification mapping of (E)CCEs to Res can be reversed, so that the UE received contents of all the control channel REs are now collected into (E)CCEs. At this stage the UE does not know which (E)CCEs the eNB used to transmit a (E)PDCCH addressed to an RNTI monitored by the UE, including the aggregation level that was used per (E)PDCCH. Therefore, specifications define in what sets all possible (E)CCEs should be tested to see if they form a valid (E)PDCCH, i.e. a successfully decoded DCI message for which the UE is configured. The tested sets are different depending on which RNTI is being tested.

For the example of Rel-11 PDCCH on a single serving cell, the CCEs are numbered from 0 to $N_R^{CCE}$ in subframe k. At each AL, one 'search space' of non-overlapping consecutive CCEs is defined which the UE searches until a valid PDCCH is found, or none is found. For UE-specific PDCCHs (indicated by C-RNTI, SPS C-RNTI and T-C-RNTI), the four search spaces define a number of PDCCH candidates The candidates within each search space changes per subframe depending on RNTI and subframe number. An example set of UE-specific search spaces is shown below:

AL1 (6 PDCCH candidates): {CCE9}; {CCE10}; {CCE11}; {CCE12}; {CCE13}; {CCE14}.

AL2 (6 PDCCH candidates): {CCE18, CCE19}; {CCE20, CCE21}; {CCE22, CCE23}; {CCE24, CCE25}; {CCE26, CCE27}; {CCE28, CCE29}.

AL4 (2 PDCCH candidates): {CCE36, CCE37, CCE38, CCE39}; {CCE40, CCE41, CCE42, CCE43}.

AL8 (2 PDCCH candidates): {CCE72, CCE73, CCE74, CCE75, CCE76, CCE77, CCE78, CCE79}; {CCE80, CCE81, CCE82, CCE83, CCE84, CCE85, CCE86, CCE87}.

A particular CCE may be in search spaces for more than one UE.

For common messages (indicated by SI-RNTI, P-RNTI, RA-RNTI, TPC-PUCCH-RNTI, TPC-PUSCH-RNTI), there are only two search spaces and the CCEs comprising them are the same for all UEs:AL4 (4 PDCCH candidates): {CCE0+CCE1+CCE2+CCE3}; {CCE4+CCE5+CCE6+CCE7}; {CCE8+CCE9+CCE10+CCE11}; {CCE12+CCE13+CCE14+CCE15}.

AL8 (2 PDCCH candidates):): {CCE0+CCE1+CCE2+CCE3+CCE4+CCE5+CCE6+CCE7}; {CCE8+CCE9+CCE10+CCE11+CCE12+CCE13+CCE14+CCE15}.

The common and UE-specific PDCCH search spaces may overlap in a subframe.

Search spaces for EPDCCH are defined in a similar way on ECCEs, but have a wider variety of specification rules defining the mapping of ECCEs to EPDCCH candidates that a UE monitors. As of Release 11, EPDCCH only has UE-specific search spaces, but this may change in future to include common search spaces.

The definitions of (E)CCE to (E)PDCCH mappings imply that it may not be possible to use all (E)CCEs in a subframe even where there is demand to do so, and that it may not be possible to schedule all UEs with need for a DCI in a subframe. (E)PDCCH blocking is a significant challenge for scheduling design as a result. In general, sending (E)PDCCHs at relatively lower ALs makes more flexible use of the available CCEs and thus reduces blocking, but means that UEs must be in relatively better radio conditions to successfully decode the DCI message.

Figure 6:
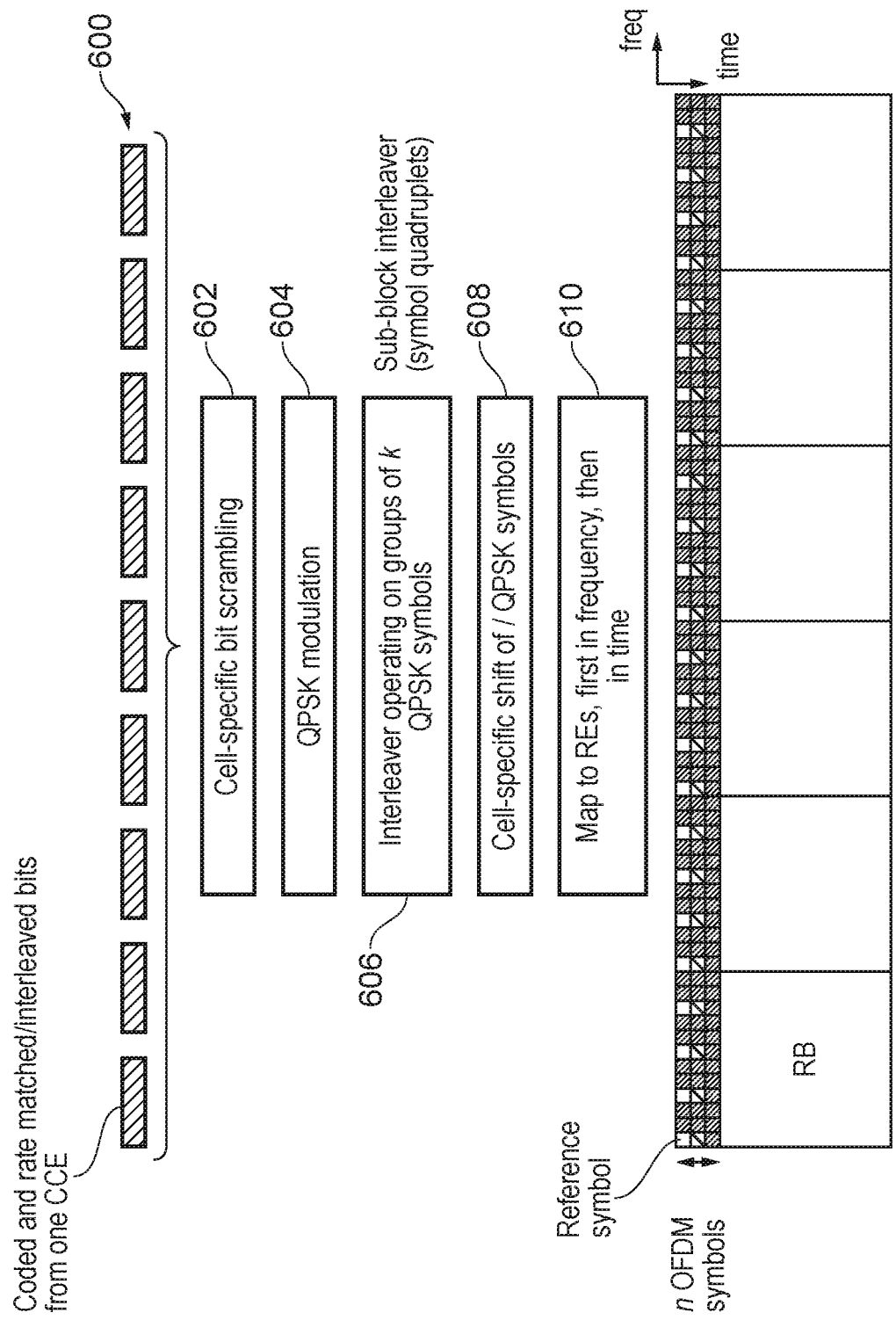
FIG. 6 is a schematic illustration of a process for mapping the CCEs on to resource elements REs within a downlink control region of a wireless access interface.

As discussed previously in the context of conventional LTE, at least some of the resource elements (REs) of the control region are defined by specification to map onto a number of so-called control channel elements (CCEs). FIG. 6 illustrates this mapping process in more detail. FIG. 6 illustrates the correspondence between CCEs and resource element (RE) groups. In general, the CCEs map to REs that are distributed across the n OFDM symbols of the control region. Aggregating more CCEs to transmit a PDCCH means that a greater proportion of the REs in the control region are devoted to that PDCCH.

As noted previously, in terms of blind decoding, the permitted aggregation level is one parameter that can be used to restrict the number of attempts at decoding the PDCCH data. As shown in FIG. 6, shaded boxes 600 each represent coded and rate matched/interleaved bits from one CCE. The information bits comprising the CCEs are subjected to a process of cell-specific bit scrambling 602, QPSK modulation 604, an interleaver operating upon groups of the resulting QPSK symbols 606, cell-specific shifting of a predetermined number of those QPSK symbols 608 and then the mapping of those symbols to REs 610 (the dark shaded slots in the left hand region of the subframe structure). Physically, any given CCE is distributed across the REs of the control region.

In summary therefore, an eNB transmits a DCI message to communications devices in a cell of the mobile communications network in one or more (E)CCEs of the downlink control channel of the wireless access interface. As indicated above the one or more (E)CCEs in which the DCI message is transmitted are selected by the eNB from a plurality of sets of possible (E)CCEs in which the infrastructure equipment can transmit the DCI message in one of the temporal units of the wireless access interface for the communications devices to search for the downlink control information in each of the plurality of possible sets of (E)CCEs. As indicated above the sets of the (E)CCEs is formed for each of the possible ALs, so that for each AL there is a sub-set of possible sets of (E)CCEs, each set of the sub-set providing one or more (E)CCEs to provide the desired aggregation level. Therefore as indicated above for example, a sub-set of the sets of CCEs for AL2 comprises the six sets for the six PDCCH candidates, which in the example are {CCE18, CCE19}; {CCE20, CCE21}; {CCE22, CCE23}; {CCE24, CCE25}; {CCE26, CCE27} and {CCE28, CCE29}.

Blind Search Load for UEs

A blind search load for UEs on (E)PDCCH is one factor in physical layer design since potentially all the possible options implied for a UE may have to be tested in every subframe. Blind search load represents modem complexity in terms of processing capability and power consumption on constituting and decoding (E)PDCCH candidates. A UE may be required to receive both PDCCH and EPDCCH in a particular subframe, and furthermore, the UE may have to search more (E)PDCCH candidates according to how many carriers it is configured with in a carrier aggregation scenario. For the example of Rel-11 PDCCH on a single serving cell, the worst case is that the UE is configured for a particular RNTI to check for two distinct DCI formats in each UE-specific and each common search space, resulting in a total of up to 44 blind decodes before locating the relevant PDCCH (if one is sent at all in that subframe).

Coverage Extension for UEs

As indicated above, MTC types UEs may be disposed in locations, which have poor radio link conditions to/from the eNB. Such applications/service can typically be assumed to be much more tolerant of latency than normal LTE applications/services. One way to improve the cellular coverage of LTE for such UEs is to introduce repetition transmission on the physical channels. For PDCCH, results reported in 3GPP TR 36.888 v2.1.1 suggest that several tens of repetitions may be needed to meet expected MTC deployment scenarios. The repetition is in addition to the AL, which are used to deliver the DCI in each sub-frame or repetition of subframes. Repetition involves repeating the transmission of the DCI in other subframes so that the DCI can be aggregated across a plurality of subframe transmissions.

It may further be required that the UE specifications can be implemented with low complexity since this can create an opportunity to lower modem cost. Low complexity/cost UEs are particularly attractive for use in MTC settings where the LTE modem cost must typically be a small fraction of the cost of the device and/or services or applications it supports.

Example Configurations of the CCE ALs for Reduced Capability/MTC Type Devices

When the eNB is using repetition to extend coverage, it would be advantageous for a UE not to have to monitor all candidates of possible sets of (E)CCEs in all subframes. Otherwise this would require the UE to search an extremely complex joint set of search spaces spanning many subframes since it cannot reliably recover the DCI from decoding the (E)CCEs in a single subframe. This could cause the UE to have elevated power consumption and significantly increased computational complexity needs, making it unsuitable for deployment as an MTC device.

Accordingly embodiments of the present technique provide an arrangement in which the search space for a UE is reduced, so that the power consumption and UE computational complexity can be reduced, whilst still providing eNB (E)PDCCH scheduling flexibility (and limiting (E)PDCCH blocking probability). The arrangement provides for a UE to monitor a fixed possible set of (E)CCEs according to a predetermined AL. Typically the UE forms a set of UEs, which are distinguished from conventional UEs so that the set of UEs may be reduced capability devices. The UE monitors therefore a restricted set of (E)PDCCH search spaces, according to a configuration from eNB in dependence on the coverage extension requirements reported by the UE and/or evaluated by the eNB, or according to specifications. The restricted sets of search spaces are defined by eliminating certain ALs from the sets of possible ALs from being monitored by the UE. According to the present technique therefore an adapted eNB is configured for one or more of the communications devices which have been identified as having been configured to operate in accordance with embodiments of the present technique to transmit the downlink control channel information in a set of one or more of the (E)CCEs selected from a predetermined sub-set of the plurality of possible sets of (E)CCEs in one or more of the temporal units of the wireless access interface. The predetermined sub-set of the possible sets of (E)CCEs is selected to provide a fixed AL so that the identified UEs can search the downlink control channel in the predetermined sub-set of the plurality of possible sets of (E)CCEs. The eNB can for example transmit the DCI in a set of CCEs comprising CCE0+CCE1+CCE2+CCE3+CCE4+CCE5+CCE6+CCE7 to provide an AL of eight (AL8). As such and according to the above explanation, the UEs which are configured to operate in accordance with the present technique need only search a sub-set of the plurality of sets of possible (E)CCEs, which for an AL of eight for PDCCH comprises for example two PDCCH candidates, which are {CCE0+CCE1+CCE2+CCE3+CCE4+CCE5+CCE6+CCE7}; and {CCE8+CCE9+CCE10+CCE11+CCE12+CCE13+CCE14+CCE15}. Accordingly the search space and blind search load for such UEs is proportionally reduced. As will be appreciated other ALs could be established for these UEs as the fixed AL, which correspondingly identifies the sub-set of the possible sets of the (E)CCEs for communicating the DCI.

The following sections provide more detailed examples:

1. Fixed Monitored Higher AL, Configurable Monitored Lower AL

According to a first example embodiment, there is defined in specifications a fixed higher AL which the UE shall monitor, $AL_{fix}$, which in a typical example of coverage extension would be the highest AL available, such as 8 on Rel-11 PDCCH. In addition, there is a UE-specific or cell-specific configuration of a variable lower AL, $AL_{var}$, in which the UE also monitors a search space. For example, if $AL_{fix}=8$, the eNB or operator might select $AL_{var}=2$, and this mixture allows the eNB a trade-off between coverage extension and scheduling flexibility. At times of low PDCCH load, $AL_{var}$ could be increased for deep coverage UEs, so that the trade-off is weighted more toward coverage extension (including setting $AL_{var}=AL_{fix}$).

In general, there could be more than one variable AL configured, which would be an implementation of relevance to control channel designs with a wider range of ALs available than PDCCH—for example (E)PDCCH where ALs up to 32 (i.e. 1, 2, 4, 8, 16, 32) are supported. In such a case, $AL_{fix}$ could be an intermediate value, such as $AL_{fix}=8$, and there could be a value set for $AL_{var}$, e.g. $AL_{var}=\{2, 32\}$ where both values are configurable allowing a stronger trade-off between coverage extension at high ALs and EPDCCH scheduling flexibility at low ALs, whilst still guaranteeing that UE blind search load can be reduced by setting, in this example, $AL_{var}=\{8, 8\}=AL_{fix}$ and allowing the UE to monitor only one search space supporting a moderate coverage level.

2. Fixed Monitored Lower AL, Configurable Monitored Higher AL

A second embodiment is like the first embodiment, except that the lower AL to monitor is fixed and the higher level is configurable. This allows the eNB to determine the coverage extension need on a per-UE or per-cell basis, and avoids a need to default to e.g. the highest AL supported by a particular (E)PDCCH specification. The fixed lower AL ensures that the eNB has the flexibility to schedule a UE at a low AL when PDCCH load is high and the coverage extension UE's traffic is relatively low priority.

3. Monitored AL 'Hopping'

A third embodiment is like the first or second embodiments, but the UE does not monitor both (or all) the restricted ALs in all subframes. Instead, there is a further configuration or specification that defines which AL(s) is/are monitored in which subframe. In an example of the second embodiment where $AL_{var}=8$ and $AL_{fix}=2$, the UE can be configured to monitor only $AL_{var}$ in odd subframes of a radio frame and only $AL_{fix}$ in even subframes of a radio frame. The pattern could be further defined over radio frames (e.g. $AL_{var}$ in odd subframes of even SFN radio frames and $AL_{fix}$ in even subframes of even SFN radio frames and $AL_{var}$ in even subframes of odd SFN radio frames and $AL_{fix}$ in odd subframes of odd SFN radio frames).

The advantage of this example is that the eNB has the ability to only send (E)PDCCH to coverage extension UEs in the subframes where the UE monitors the higher AL search space, although this would increase the latency of decoding a repeated (E)PDCCH. Alternatively, the eNB can transmit (E)PDCCH in all subframes with the pattern $AL\{8, 2, 8, 2, \ldots\}$ and, although this will require more subframes than $AL\{8, 8, 8, 8, \ldots\}$ the eNB has improved (E)PDCCH scheduling ability in the AL2 subframes.

In a variation, this AL 'hopping' could be defined, e.g. in odd subframes to monitor AL $\{2$ and $8\}$ and in even subframes AL8 only.

In this embodiment, it is not necessary that one (or more) AL(s) be defined as being monitored and another (or more) AL(s) be configured for monitoring. It is sufficient that the UE is required to monitor a limited number of AL search spaces in some subframe pattern.

4. Monitored AL Ramping/Cycling

In a fourth embodiment, like the first embodiment, there is a fixed AL search space defined to be monitored by the UE, e.g. $AL_{fix}=8$, and a variable lower AL search space also. However, in this embodiment, the lower AL $AL_{var}$ is operated to increase over time, so for example the sequence of AL search spaces monitored by the UE in successive subframes might be:

$AL\{1, 8\}, AL\{1, 8\}, AL\{2, 8\}, AL\{2, 8\}, AL\{4, 8\},$
$AL\{4, 8\}, AL\{4, 8\}, AL\{8\}, AL\{9\}, AL\{8\}, AL\{1, 8\} \ldots$ In the early subframes of such a pattern, the eNB has (E)PDCCH scheduling freedom from the availability of the lower AL, and this may be suitable if the MTC traffic is delay tolerant as is typically the case. In the later subframes, the cell becomes more focussed on reaching the deep coverage UEs, before eventually cycling around in favour of (E)PDCCH scheduling freedom again. In all the subframes, the UE is not expected to monitor more than two AL search spaces, helping to keep UE blind search complexity low. Since a deep coverage UE might need several tens of repetitions of (E)PDCCH, such a pattern would be repeated several times. In general, the pattern need not be cyclical, of course.

5. Monitored (E)PDCCH Candidate 'Hopping'

In a fifth example embodiment, the UE is expected to monitor only a limited subset of the (E)PDCCH candidates at a given AL. For example, a deep coverage UE that is monitoring at least an AL8 PDCCH (which can be configured as in earlier embodiments) is in this embodiment expected to monitor for example only the second AL8 candidae {CCE8+CCE9+CCE10+CCE11+CCE12+CCE13+CCE14+CCE15} in odd subframes and the first AL8 candidate {CCE0+CCE1+CCE2+CCE3+CCE4+CCE5+CCE6+CCE7}; in even subframes (of subframes where it monitors AL8). The same principle can apply to the other (or another) AL the UE is monitoring in a previous embodiment, e.g. if AL2 is also monitored in some subframes, then the UE might be expected only to monitor the second candidate in odd subframes and only the fifth candidate in even subframes of the subframes where it monitors AL2.

The benefit of this embodiment is that the blind search load for the UE is further reduced, especially in an extended (E)PDCCH repetition scenario, but the same (E)CCEs are not blocked in all subframes to the eNB, and the UE's (E)PDCCH can experience time/frequency hopping.

5. Applicability

For UE-specific search space (E)PDCCHs, the set of (E)CCEs which are used to communicate the DCI with a variable AL can be configured directly by the eNB once RRC connection is established, or earlier, for example by including configuration details in a Random Access Response (RAR) addressed to relevant UE(s). In this case, there could also be a cell-specific component to the configuration intended for use in the case of common search space (E)PDCCHs. The cell-specific component could be included in the UE dedicated signalling, or could be broadcast or specified. The UE-specific implementation could be on the basis of for example measurement feedback from the UE such as RSRP/RSRQ indicating the degree of coverage extension repetition the UE needs, on the basis of HARQ NACK feedback, or CQI feedback, or DTX rate (i.e. rate of neither NACK nor ACK) from the UE implying failure to receive an associated (E)PDCCH.

For common search space (E)PDCCHs, embodiments of the present technique can be applied generally to those common messages the eNB knows are applicable to UEs which have been adapted to operate in accordance with the present technique. For the case of the RAR and transmit power control (TPC) messages, these are applicable to groups of UEs which can be selected by the eNB. Likewise, a Paging message is addressed internally to a number of UEs. For these messages, the eNB will have been made aware of the capability of the UE before the UE needs to receive these messages and therefore receive them from the configured CCEs and arrange its (E)PDCCH scheduling appropriately.

For transmission of system information blocks (SIBs) in system information messages (SI-messages), the eNB could apply the AL or candidate restriction pattern with which adapted UEs have been configured to all PDCCHs scheduling SIBs. This would not affect legacy UEs, which would still locate the relevant PDCCHs by exhaustive blind search, but the adapted UEs would benefit from the complexity and power reduction implied by the restriction of the search space provided by the present technique. In addition, the present technique could be applied to an SIB or SIBs that might be introduced with specific relevance limited to UEs which have been adapted to operate in accordance with the present technique. These SIB(s) would therefore not for decodable by legacy UEs. Then, adapted UEs could locate (E)PDCCHs scheduling new SIBs, and there is no requirement for alteration to UE behaviour (nor implied restriction of eNB behaviour) in respect of other SIBs, although alteration to other SIBs could also be applied as previously described.

7. Other Example Embodiments

According to other examples, the set of the plurality of (E)CCEs may be configurable, which could be arranged to be cell-specific and configured in broadcast messages or common UE configurations, or they could be UE-specific in dedicated signalling, or they could be provided in specifications, or in any suitable combination. A typical implementation could have cell-specific and/or specification-defined operation in respect of common search space (E)PDCCHs, and UE-specific operation in respect of UE-specific search space (E)PDCCHs. Furthermore, the arrangement of the selected set of (E)CCEs within a cell can be configured by an eNB. According to this arrangement, UEs search exhaustively for (E)PDCCHs according to normal rules. Therefore by indicating to a sub-set of the UEs, such as UEs which are MTC-type devices, that a reduced configuration of possible sets of (E)CCEs are being used to convey the DCI messages, then there can be correspondingly a reduced search space. Although the enablement indication would apply per-UE, it could be signalled per-cell in for example broadcast signalling via a signal such as system information block (SIB). This signalling could indicate that UEs with a coverage extension capability should operate in accordance with the present technique when they are informed that repetition is being used on (E)PDCCH. In another example a specification could define that a UE is configured with repetition for coverage extension, according to which the UEs always searches for (E)PDCCHs in accordance with a fixed (E)CCE pattern per sub-frame or a combination with a fixed and a variable set of CCEs.

In existing systems, the search spaces a UE monitors are the same in every subframe. Embodiments of the present disclosure, can provide a known pattern in which the search spaces change, and that pattern is configurable or designable in dependence on the coverage depth of UEs and the (E)PDCCH scheduling needs of the eNB. This leads to the fact that different UEs in a cell may be monitoring different search spaces within the same subframe, whereas in existing systems by definition all UEs monitor the same subframe (if they have the same basic configuration). Furthermore, 'hopping' of montoring among the defined (E)PDCCH candidates does not exist in the art.

Example Implementation

Figure 7:
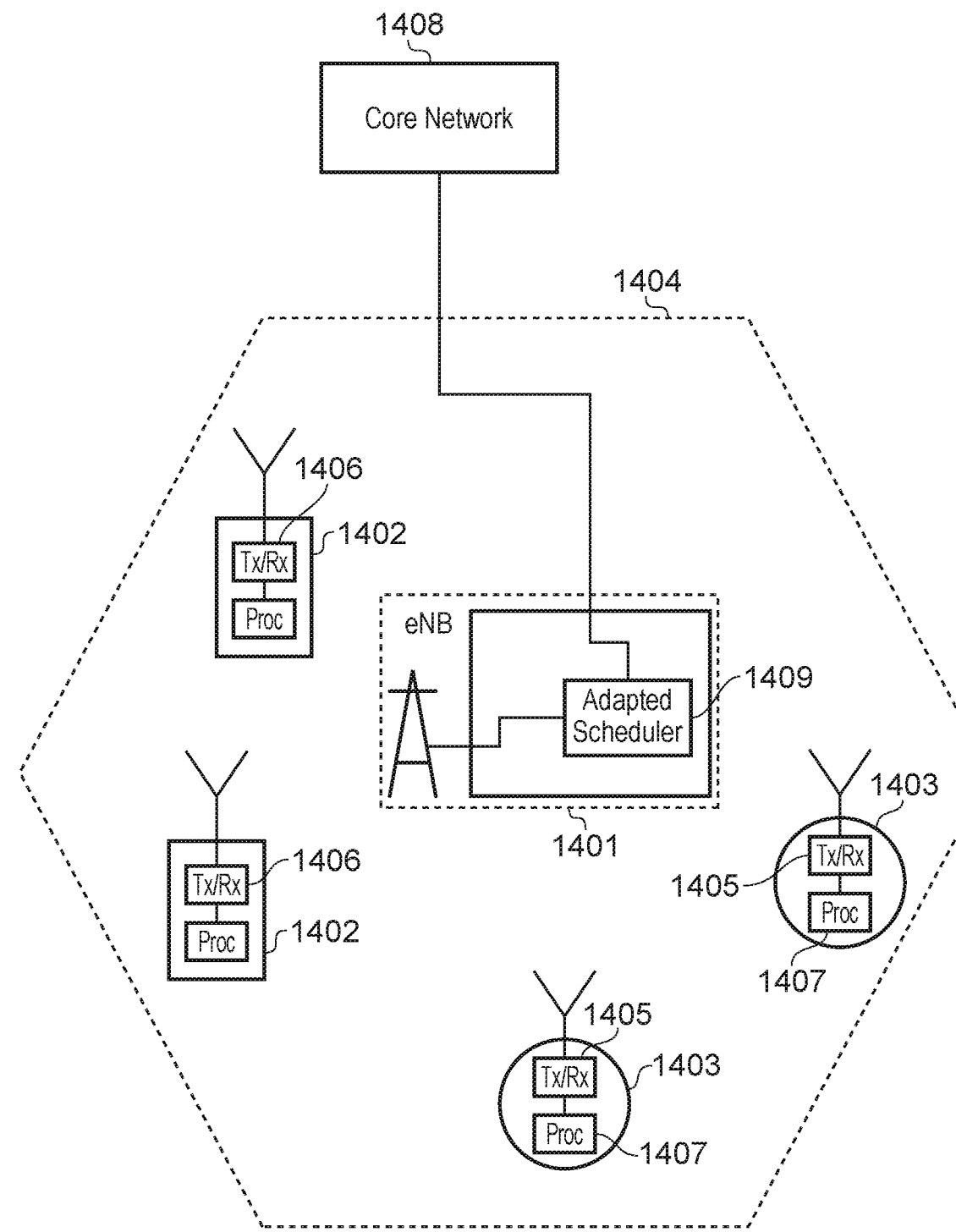
FIG. 7 provides a schematic diagram illustrating a part of an LTE cellular communications network adapted in accordance with an embodiment of the present technique.

FIG. 7 provides a schematic diagram showing part of an adapted mobile communication system arranged in accordance with an embodiment of the present technique to operate in accordance with an LTE standard. The system includes an adapted eNB 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405, which includes a receiver unit capable of receiving data across a reduced bandwidth (i.e. narrowband) and a transmitter unit capable of transmitting data across a reduced bandwidth when compared with the capabilities of the transceiver units 1406 included in the conventional LTE terminals 1402.

The adapted eNB 1401 is arranged to transmit DCI messages using a sub-frame structure that includes a fixed one of a possible set of CCEs for a sub-set of the UEs 1403 according to the examples described above. According to some examples the adapted eNB 1401 is configured to provide a virtual carrier for the UEs 1403.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, UE etc. Furthermore, the term base station refers to any wireless network entity that provides UEs with an air interface to a cellular telecommunications network: while the term has been used interchangeably with e-NodeB in the foregoing it should be understood that it encompasses equivalent network entities in LTE and alternative radio access architectures including: eNode-Bs; Node-Bs, pico-, femto- and micro base station equipment, relays; boosters etc.

Various further aspects and features of the present technique are defined in the following numbered clauses:

1. A communications device for transmitting data to or receiving data from a mobile communications network, the communications device comprising:
   a transmitter unit adapted to transmit data to the mobile communications network via a wireless access interface provided the mobile communications network,
   a receiver unit adapted to receive data from the mobile communications network via the wireless access interface, the wireless access interface being divided into a plurality of time divided temporal units and including in each temporal unit a down-link control channel and a down-link shared channel, and
   a controller configured to control the receiver unit to receive downlink control channel information transmitted by the mobile communications network in one or more control channel elements of the downlink control channel of the wireless access interface, wherein the one or more control channel elements in which the downlink control channel information is transmitted is one of a plurality of sets of possible control channel elements in which the mobile communications network can transmit the downlink control information in one of the temporal units of the wireless access interface for communications devices to search for the downlink control information in each of the plurality of possible sets of control channel elements, wherein the controller for the communications device is configured to control the receiver unit
   to receive the downlink control channel information by searching the downlink control channel in a predetermined sub-set of the plurality of possible sets of control channel elements in one or more of the temporal units of the wireless access interface according to a fixed aggregation level.

2. A communications device according to clause 1, wherein the controller is configured to control the receiver to receive the downlink control channel information by searching for the downlink control channel information in either the predetermined sub-set of the plurality of possible sets of control channel elements in one of more of the temporal units according to the fixed aggregation level or a second sub-set of possible control channel elements which is selected from the plurality of possible sets of the control channel elements in one or more temporal units according to a configurable aggregation level.

3. A communications device according to clause 2, wherein the controller is configured in combination with the receiver to receive an indication, from the mobile communications network, of the second sub-set of possible sets of control channel elements for the one or more temporal units of the wireless access interface providing the configurable aggregation level.

4. A communications device according to any of clauses 1, 2 or 3, wherein the one or both of the predetermined sub-setof the plurality of possible sets of control channel elements or the second sub-set of the possible sets of the control channel elements is common for one or more other communications devices.

5. A communications device according to any of clauses 1, 2 or 3, wherein the one or both of the predetermined sub-set of the plurality of possible sets of control channel elements or the second sub-set of the possible sets of the control channel elements is specific to the communications device.

6. A communications device according to clause 1 to 5, wherein each of the control channel elements of the predetermined sub-set of the plurality of possible sets of control channel elements or the second sub-set of the possible sets of the control channel elements each comprise enhanced control channel elements of an enhanced downlink control channel.

7. A communications device according to clause 1 to 5, wherein the one or both of the predetermined sub-set of the plurality of possible sets of control channel elements or the second sub-set of the possible sets of the control channel elements changes from one of the plurality of possible sets of control channel elements to another of the plurality of possible sets of control channel elements from one of the temporal-units to another.

8. A communications device according to clause 1 to 7, wherein the searching for the downlink control channel information in the predetermined sub-set of the plurality of possible sets of control channel elements according to the fixed aggregation level comprises searching a set of one or more control channel elements from the sub-set of possible sets of control channel elements in a temporal unit of the wireless access interface.

9. A method of receiving down link control information at a communications device from a mobile communications network, the method comprising
   receiving downlink control channel information transmitted by the mobile communications network in one or more control channel elements of a downlink control channel of a wireless access interface in one of a plurality of temporal units, the wireless access interface being provided by the mobile communications network for transmitting data to or receiving data from the communications device, the wireless access interface being divided into the plurality of time divided temporal units and including in each temporal unit the down-link control channel and a down-link shared channel, wherein the one or more control channel elements in which the downlink control channel information is transmitted is one of a plurality of sets of possible control channel elements in which the mobile communications network can transmit the downlink control information in one of the temporal units of the wireless access interface for communications devices to search for the downlink control information in each of the plurality of possible sets of control channel elements, wherein the receiving comprises
   searching for the downlink control channel information by searching in a predetermined sub-set of the plurality of possible sets of control channel elements in the downlink control channel for one or more of the temporal units of the wireless access interface according to a fixed aggregation level.

10. A method according to clause 9, wherein the searching comprises searching for the downlink control channel information in either the predetermined sub-set of the plurality of possible sets of control channel elements in one of more of the temporal units according to the fixed aggregation level or a second sub-set of the sets of possible control channel elements which is selected from the plurality of possible sets of the control channel elements in one or more temporal units according to a configurable aggregation level.

11. A method according to clause 10, comprising receiving an indication, from the mobile communications network, of the second sub-set of possible sets of control channel elements for the one or more temporal units of the wireless access interface providing the configurable aggregation level.

12. A method according to any of clauses 9, 10 or 11, wherein the one or both of the predetermined sub-set of the plurality of possible sets of control channel elements or the second sub-set of the possible sets of control channel elements is common for one or more other communications devices.

13. A method according to any of clauses 9, 10 or 11, wherein the one or both of the predetermined sub-set of the plurality of possible sets of control channel elements or the second sub-set of the possible set of control channel elements is specific to the communications device.

14. A method according to any of clauses 9 to 13, wherein each of the control channel elements of the one or both of the predetermined sub-set of the plurality of possible sets of control channel elements or the second sub-set of the possible sets of control channel elements is an enhanced control channel element of an enhanced downlink control channel.

15. A method according to any of clauses 9 to 14, wherein the one or both of the predetermined sub-set of the plurality of possible sets of control channel elements or the second sub-set of the possible sets of control channel elements changes from one set of the plurality of control channel elements to another set of the plurality of control channel elements from one of the time-units to another.

16. A method according to any of clauses 9 to 15, wherein the searching for the downlink control channel information in the predetermined sub-set of the plurality of possible sets of control channel elements according to the fixed aggregation level comprises searching a set of one or more control channel elements from the sub-set of possible sets of control channel elements in a temporal unit.

17. An infrastructure equipment for transmitting data to or receiving data from communications devices in a mobile communications network, the infrastructure equipment comprising a transmitter unit adapted to transmit signals to the communications devices in accordance with a wireless access interface, a receiver unit adapted to receive signals from the communications devices in accordance with the wireless access interface, and a controller configured to control the receiver unit and the transmitter unit to form the wireless access interface, the wireless access interface being divided into a plurality of time divided temporal units and including in each temporal unit a down-link control channel and a down-link shared channel, and the controller is configured in combination with the transmitter to transmit downlink control channel information to communications devices in one or more control channel elements of the downlink control channel of the wireless access interface, wherein the one or more control channel elements in which the downlink control channel information is transmitted is from one of a plurality of sets of possible control channel elements in which the infrastructure equipment can transmit the downlink control information in one of the temporal units of the wireless access interface for the communications devices to search for the downlink control information in each of the plurality of possible sets of control channel elements, wherein the controller is configured for one or more of the communications devices which have been identified by the controller to control the transmitter unit to transmit the downlink control channel information in a set comprising one or more control channel elements selected from a predetermined sub-set of the plurality of possible sets of control channel elements in one or more of the temporal units of the wireless access interface, the predetermined sub-set providing a fixed aggregation level so that the identified one or more of the communications terminals can search for the downlink control channel in the predetermined sub-set of the plurality of possible sets of control channel elements.

18. An infrastructure equipment according to clause 17, wherein the controller is configured to control the transmitter unit to transmit the downlink control channel information in either the predetermined sub-set of the plurality of possible sets of control channel elements in one of more of the temporal units according to the fixed aggregation level or to transmit the downlink control channel information in a second sub-set of the possible sets of control channel elements which is selected from the plurality of possible sets of control channel elements in one or more temporal units according to a configurable aggregation level, with the effect that the identified one or more communications devices searches for the downlink control channel information in both the predetermined sub-set and the second sub-set of control channel elements.

19. An infrastructure equipment according to clause 18, wherein the controller is configured in combination with the transmitter unit to transmit an indication of the second sub-set of the possible sets of control channel elements for the one or more temporal units of the wireless access interface providing the configurable aggregation level.

20. An infrastructure equipment according to any of clauses 17, 18 or 19, wherein the one or both of the predetermined sub-set of the plurality of possible sets of control channel elements or the second sub-set of possible sets of the control channel elements is specific to each of the one or more identified communications devices.

21. An infrastructure equipment according to any of clauses 17 to 20, wherein each of the control channel elements in one or both of the predetermined sub-set of the plurality of possible sets of control channel elements or the second sub-set of the plurality of possible sets of control channel elements is an enhanced control channel elements of an enhanced downlink control channel.

22. An infrastructure equipment according to any of clauses 17 to 21, wherein the controller is configured to control the transmitter unit to transmit one or both of the predetermined sub-set of the plurality of possible sets of control channel elements or the second sub-set of the plurality of possible sets of control channel elements in which the downlink control information is transmitted from one of the possible sets of the plurality of control channel elements to another of the sets of the plurality of control channel elements from one of the time-units to another.

23. A method of transmitting downlink control information to communications terminals in a mobile communications network, the method comprising transmitting signals to the communications terminals in accordance with a wireless access interface, receiving signals from the communications terminals in accordance with the wireless access interface, and controlling the receiving and the transmitting to form the wireless access interface, the wireless access interface being divided into a plurality of time divided temporal units and including in each temporal unit a down-link control channel and a down-link shared channel, wherein the controlling the transmitting comprises transmitting downlink control channel information to communications terminals in one or more control channel elements of the downlink control channel of the wireless access interface, the one or more control channel elements in which the downlink control channel information is transmitted being one of a plurality of possible sets of control channel elements in one of the temporal units of the wireless access interface for the communications devices to search for the downlink control information in each of the plurality of possible sets of control channel elements, wherein the transmitting includes identifying one or more of the communications devices, transmitting to the one or more identified communications devices the downlink control channel information in a set of the control channel elements selected from a predetermined sub-set of the plurality of possible sets of control channel elements in one or more of the temporal units of the wireless access interface, the predetermined sub-set of the possible sets of control channel elements providing a fixed aggregation level so that the identified one or more of the communications terminals can search for the downlink control channel in the predetermined sub-set of the plurality of possible sets of control channel elements.

24. A method according to clause 23, wherein the transmitting comprises transmitting the downlink control channel information in either one of the predetermined sub-set of the plurality of sets of control channel elements in one or more of the temporal units providing the fixed aggregation level or to transmit the downlink control channel information in a one of a second subset of the plurality of possible sets of control channel elements which is selected from the plurality of possible sets of the control channel elements in one or more temporal units according to a configurable aggregation level, with the effect that the identified one or more communications devices can search for the downlink control channel information.

25. A method according to clause 24, comprising the transmitting to the communications terminals an indication of the second sub-set of the possible sets of control channel elements for the one or more temporal units of the wireless access interface providing the configurable aggregation level.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3
[11] UK patent application GB 1121767.6

The invention claimed is:

1. A communications device for transmitting data to or receiving data from a mobile communications network, the communications device comprising:
   circuitry configured to
      receive data from the mobile communications network via the wireless access interface, the data provided in a radio frame that is divided into a plurality of time divided temporal units with a downlink control channel and a downlink shared channel included in each temporal unit; and
      receive downlink control channel information transmitted by the mobile communications network in one or more control channel elements of the downlink control channel included in the radio frame, wherein the one or more control channel elements in which the downlink control channel information is transmitted is one of a plurality of sets of possible control channel elements in which the mobile communications network can transmit the downlink control information in one of the temporal units of the radio frame, wherein
   the circuitry is configured to receive the downlink control channel information by searching the downlink control channel in a search space that includes at least one of (i) a predetermined sub-set of the plurality of possible sets of control channel elements in one or more of the temporal units of the radio frame according to a fixed aggregation level, and (ii) a second sub-set of possible control channel elements which is selected from the plurality of possible sets of the control channel elements in one or more temporal units according to a configurable aggregation level.

2. The communications device of claim 1, wherein the circuitry is configured to receive an indication, from the mobile communications network, of the second sub-set of possible sets of control channel elements for the one or more temporal units of the radio frame providing the configurable aggregation level.

3. The communications device of claim 1, wherein the one or both of the predetermined sub-set of the plurality of possible sets of control channel elements or the second sub-set of the possible sets of the control channel elements is common for one or more other communications devices.

4. The communications device of claim 1, wherein the one or both of the predetermined sub-set of the plurality of possible sets of control channel elements or the second sub-set of the possible sets of the control channel elements is specific to the communications device.

5. The communications device of claim 1, wherein each of the control channel elements of the predetermined sub-set of the plurality of possible sets of control channel elements or the second sub-set of the possible sets of the control channel elements each comprise enhanced control channel elements of an enhanced downlink control channel.

6. The communications device of claim 1, wherein the one or both of the predetermined sub-set of the plurality of possible sets of control channel elements or the second sub-set of the possible sets of the control channel elements changes from one of the plurality of possible sets of control channel elements to another of the plurality of possible sets of control channel elements from one of the temporal-units to another.

7. The communications device of claim 1, wherein
the searching for the downlink control channel information in the predetermined sub-set of the plurality of possible sets of control channel elements according to the fixed aggregation level comprises searching a set of one or more control channel elements from the sub-set of possible sets of control channel elements in a temporal unit of the wireless access interface.

8. A method of receiving down link control information at a communications device from a mobile communications network, the method comprising:
receiving, via a wireless access interface, downlink control channel information transmitted by the mobile communications network in one or more control channel elements of a downlink control channel of a radio frame a plurality of temporal units, the wireless access interface being provided by the mobile communications network for transmitting data to or receiving data from the communications device, the radio frame being divided into a plurality of time divided temporal units with the downlink control channel and a downlink shared channel included in each temporal unit, Wherein the one or more control channel elements in which the downlink control channel information is transmitted is one of a plurality of sets of possible control channel elements in which the mobile communications network can transmit the downlink control information in one of the temporal units of the radio frame, wherein
the receiving comprises searching for the downlink control channel information by searching in a search space that includes at least one of (i) a predetermined sub-set of the plurality of possible sets of control channel elements in the downlink control channel for one or more of the temporal units of the radio frame according to a fixed aggregation level, and (ii) a second sub-set of possible control channel elements which is selected from the plurality of possible sets of the control channel elements in one or more temporal units according to a configurable aggregation level.

9. The method of claim 8, further comprising:
receiving an indication, from the mobile communications network, of the second sub-set of possible sets of control channel elements for the one or more temporal units of the radio frame providing the configurable aggregation level.

10. The method of claim 9, wherein
the one or both of the predetermined sub-set of the plurality of possible sets of control channel elements or the second sub-set of the possible sets of control channel elements is common for one or more other communications devices.

11. The method of claim 8, wherein
the one or both of the predetermined sub-set of the plurality of possible sets of control channel elements or the second sub-set of the possible set of control channel elements is specific to the communications device.

12. The method of claim 8, wherein
each of the control channel elements of the one or both of the predetermined sub-set of the plurality of possible sets of control channel elements or the second sub-set of the possible sets of control channel elements is an enhanced control channel element of an enhanced downlink control channel.

13. The method of claim 8, wherein
the one or both of the predetermined sub-set of the plurality of possible sets of control channel elements or the second sub-set of the possible sets of control channel elements changes from one set of the plurality of control channel elements to another set of the plurality of control channel elements from one of the time-units to another.

14. The method of claim 8, wherein
the searching for the downlink control channel information in the predetermined sub-set of the plurality of possible sets of control channel elements according to the fixed aggregation level comprises searching a set of one or more control channel elements from the sub-set of possible sets of control channel elements in a temporal unit.

15. Circuitry for a communications device for transmitting data to or receiving data from a mobile communications network, the circuitry configured to:
receive, via a wireless access interface, downlink control channel information transmitted by the mobile communications network in one or more control channel elements of a downlink control channel of a radio frame a plurality of temporal units, the wireless access interface being provided by the mobile communications network for transmitting data to or receiving data from the communications device, the radio frame being divided into a plurality of time divided temporal units with the downlink control channel and a downlink shared channel included in each temporal unit, wherein the one or more control channel elements in which the downlink control channel information is transmitted is one of a plurality of sets of possible control channel elements in which the mobile communications network can transmit the downlink control information in one of the temporal units of the radio frame, wherein
the receiving comprises searching for the downlink control channel information by searching in a search space that includes at least one of (i) a predetermined sub-set of the plurality of possible sets of control channel elements in the downlink control channel for one or more of the temporal units of the radio frame according to a fixed aggregation level, and (ii) a second sub-set of possible control channel elements which is selected from the plurality of possible sets of the control channel elements in one or more temporal units according to a configurable aggregation level.

16. The circuitry of claim 15, wherein
the circuitry is further configured to receive an indication, from the mobile communications network, of the second sub-set of possible sets of control channel elements for the one or more temporal units of the radio frame providing the configurable aggregation level.

17. The circuitry of claim 15, wherein
the one or both of the predetermined sub-set of the plurality of possible sets of control channel elements or the second sub-set of the possible sets of control channel elements is common for one or more other communications devices.

18. The circuitry of claim 15, wherein
the one or both of the predetermined sub-set of the plurality of possible sets of control channel elements or the second sub-set of the possible set of control channel elements is specific to the communications device.

19. The circuitry of claim 15, wherein
each of the control channel elements of the one or both of the predetermined sub-set of the plurality of possible sets of control channel elements or the second sub-set of the possible sets of control channel elements is an enhanced control channel element of an enhanced downlink control channel.

20. The circuitry of claim 15, wherein
the one or both of the predetermined sub-set of the plurality of possible sets of control channel elements or the second sub-set of the possible sets of control channel elements changes from one set of the plurality of control channel elements to another set of the plurality of control channel elements from one of the time-units to another.

* * * * *